(12) United States Patent
Marik et al.

(10) Patent No.: US 10,699,588 B2
(45) Date of Patent: Jun. 30, 2020

(54) AIRCRAFT TAXI ROUTING

(71) Applicant: Honeywell International Inc., Morris Plains, NJ (US)

(72) Inventors: Karel Marik, Revnice (CZ); Karel Macek, Prague (CZ)

(73) Assignee: Honeywell International Inc., Morris Plains, NJ (US)

(*) Notice: Subject to any disclaimer, the term of this patent is extended or adjusted under 35 U.S.C. 154(b) by 185 days.

(21) Appl. No.: 15/845,345

(22) Filed: Dec. 18, 2017

(65) Prior Publication Data

US 2019/0189018 A1 Jun. 20, 2019

(51) Int. Cl.
| | |
|---|---|
| G08G 5/06 | (2006.01) |
| G01C 21/34 | (2006.01) |
| G08G 5/00 | (2006.01) |
| B64F 1/00 | (2006.01) |
| G01C 21/20 | (2006.01) |

(52) U.S. Cl.
CPC ............ *G08G 5/065* (2013.01); *B64F 1/002* (2013.01); *G01C 21/20* (2013.01); *G01C 21/3492* (2013.01); *G08G 5/0013* (2013.01); *G08G 5/0021* (2013.01)

(58) Field of Classification Search
CPC .... G08G 5/065; G08G 5/0078; G08G 5/0021; G08G 5/0039; G08G 5/0065; B64F 1/002; B64F 1/02; B64F 1/20; B64F 1/10; B64F 1/18; G01C 21/20; G01C 21/14; G01C 21/34
See application file for complete search history.

(56) References Cited

U.S. PATENT DOCUMENTS

| | | | | |
|---|---|---|---|---|
| 3,706,969 A | * | 12/1972 | Paredes | G08G 5/0013 340/989 |
| 3,855,571 A | * | 12/1974 | Massa | G08G 5/0021 340/990 |
| 4,122,522 A | * | 10/1978 | Smith | G08G 5/0013 340/959 |
| 4,151,595 A | * | 4/1979 | Pressiat | G05D 1/0083 340/940 |
| 6,282,488 B1 | * | 8/2001 | Castor | G08G 5/065 701/120 |
| 6,411,890 B1 | * | 6/2002 | Zimmerman | B64F 1/002 340/952 |
| 7,050,909 B2 | * | 5/2006 | Nichols | G08G 5/0078 348/119 |

(Continued)

*Primary Examiner* — Hunter B Lonsberry
*Assistant Examiner* — Luis A Martinez Borrero
(74) *Attorney, Agent, or Firm* — Brooks, Cameron & Huebsch, PLLC (57) ABSTRACT

Methods, devices, and systems for aircraft taxi routing are described herein. One device includes instructions stored thereon which, when executed by a processor, cause the processor to receive a record of a plurality of historical routes taken by a plurality of aircraft through taxiways of an airport, receive an indication of a plurality of conditions particular to the airport, receive an indication of a starting point of a proposed route in the airport and an endpoint of the airport, wherein the starting point and the endpoint are associated with a proposed taxiing of an aircraft, determine a route between the starting point and the endpoint based on the plurality of historical routes and the plurality of conditions, and provide the determined route to an air traffic controller.

19 Claims, 3 Drawing Sheets

(56) References Cited

U.S. PATENT DOCUMENTS

| | | | | |
|---|---|---|---|---|
| 7,386,391 B2* | 6/2008 | Morariu | B61L 27/0027 | 701/117 |
| 8,024,078 B2* | 9/2011 | Coulmeau | G08G 5/0013 | 244/75.1 |
| 8,180,562 B2* | 5/2012 | Clark | G01C 23/00 | 342/34 |
| 8,403,259 B2* | 3/2013 | Charuel | B64C 25/405 | |
| 8,428,872 B2* | 4/2013 | Clark | G08G 5/0039 | 345/168 |
| 8,594,917 B2* | 11/2013 | Sawhill | G08G 5/0013 | 701/122 |
| 8,620,493 B2* | 12/2013 | Hughes | G05D 1/0202 | 244/76 R |
| 8,935,018 B2* | 1/2015 | Hughes | G05D 1/0202 | 244/76 R |
| 9,033,273 B2* | 5/2015 | Edelson | G08G 5/065 | 244/50 |
| 9,043,043 B1* | 5/2015 | Gribble | G05D 1/00 | 701/1 |
| 9,074,891 B2* | 7/2015 | Nutaro | G01C 21/00 | |
| 9,394,059 B2* | 7/2016 | Cox | B64D 45/00 | |
| 9,849,972 B2* | 12/2017 | Morris | B60T 8/1703 | |
| 9,958,867 B2* | 5/2018 | Cox | G05D 1/0202 | |
| 2003/0160708 A1* | 8/2003 | Knoop | G08G 5/0043 | 340/958 |
| 2006/0259232 A1* | 11/2006 | Huthoefer | G08G 5/065 | 701/120 |
| 2008/0109163 A1* | 5/2008 | Stone | G08G 5/0008 | 301/16 |
| 2008/0275642 A1* | 11/2008 | Clark | G01C 23/00 | 701/457 |
| 2009/0045982 A1* | 2/2009 | Caillaud | G01C 21/00 | 340/972 |
| 2010/0198489 A1* | 8/2010 | Rozovski | G08G 5/0013 | 701/120 |
| 2010/0204909 A1* | 8/2010 | Gayraud | G05D 1/0083 | 701/120 |
| 2011/0046868 A1* | 2/2011 | Michel | G01C 21/00 | 701/120 |
| 2011/0313645 A1* | 12/2011 | Shukla | G08G 5/065 | 701/120 |
| 2012/0075121 A1* | 3/2012 | O'Hara | G08G 5/06 | 340/961 |
| 2012/0191332 A1* | 7/2012 | Sawhill | G08G 5/0013 | 701/120 |
| 2013/0297102 A1* | 11/2013 | Hughes | G05D 1/0083 | 701/3 |
| 2014/0067169 A1* | 3/2014 | Hughes | G05D 1/0083 | 701/3 |
| 2014/0114557 A1* | 4/2014 | Nutaro | G01C 21/00 | 701/121 |
| 2014/0303815 A1* | 10/2014 | Lafon | G01C 21/3446 | 701/3 |
| 2014/0330454 A1* | 11/2014 | Purpura | B64D 45/00 | 701/3 |
| 2015/0051757 A1* | 2/2015 | Cox | B64D 45/00 | 701/3 |
| 2015/0142214 A1* | 5/2015 | Cox | G05D 1/0202 | 701/3 |
| 2016/0140849 A1* | 5/2016 | Ball | G08G 5/0021 | 701/538 |
| 2016/0140855 A1* | 5/2016 | Gannon | G08G 5/065 | 701/533 |
| 2016/0171899 A1* | 6/2016 | Depare | G08G 5/065 | 701/120 |
| 2017/0032687 A1* | 2/2017 | Lamkin | G08G 5/065 | |
| 2018/0061243 A1* | 3/2018 | Shloosh | G08G 5/065 | |
| 2018/0374370 A1* | 12/2018 | Hvezda | G08G 5/065 | |

* cited by examiner

AIRCRAFT TAXI ROUTING

TECHNICAL FIELD

The present disclosure relates to methods, devices, and systems for aircraft taxi routing.

BACKGROUND

Air and/or ground traffic control at an airport can direct aircraft on the ground and aircraft in airspace near the airport, as well as provide advisory services to other aircraft in airspace not controlled by air traffic control at the airport. Directing aircraft on the ground and in the air can prevent collisions between aircraft, organize and expedite aircraft traffic, and provide information and/or support for aircraft pilots.

An airport can include many different runways and taxiways. Directing aircraft on the ground can include determining a particular route for an aircraft to travel from a starting point to an endpoint. For instance, a route can be determined from a boarding area to a runway or vice versa. Previous approaches to routing aircraft on the ground may include routing algorithms that determine a shortest path from a starting point to an end point. However, these approaches may not take current conditions into account and may not contemplate preferences and/or dislikes of certain routes by air traffic controllers. As a result, air traffic controllers may be frustrated by having to correct the determined routes of previous approaches.

DETAILED DESCRIPTION

Methods, devices, and systems for aircraft taxi routing are described herein. In some examples, one or more embodiments include a non-transitory computer-readable medium having instructions stored thereon which, when executed by a processor, cause the processor to receive a record of a plurality of historical routes taken by a plurality of aircraft through taxiways of an airport, receive an indication of a plurality of conditions particular to the airport, receive an indication of a starting point of a proposed route in the airport and an endpoint of the airport, wherein the starting point and the endpoint are associated with a proposed taxiing of an aircraft, determine a route between the starting point and the endpoint based on the plurality of historical routes and the plurality of conditions, and provide the determined route to an air traffic controller.

As used herein, a controller can be a user (e.g., a person) associated with the airport operator or air navigational service provider entrusted with the responsibility of providing airport traffic services to aircraft and/or other vehicles on the grounds of an airport. An airport can include multiple controllers. A controller, as referred to herein, can include a ground controller, an air traffic controller, an airport traffic controller, etc.

Aircraft taxi routing, in accordance with the present disclosure, can allow for safe and efficient management of airport ground traffic in and around the airport, providing a safe and efficient flow of traffic and reducing delays for passengers and/or airlines. Whereas previous approaches may determine a shortest path from a starting point to an end point, embodiments of the present disclosure are less likely to be discarded and/or amended by controllers because their preferences and/or tendencies are considered. Additionally, embodiments of the present disclosure can take current conditions (e.g., conditions of the airport and/or the aircraft) into account. As a result, controllers can avoid the frustrations associated with correcting the determined routes of previous approaches. Consequently, more aircraft traffic can flow and the throughput of the airport can be increased. Increased throughput can yield direct monetary rewards and improved traveler experiences. Embodiments herein can increase the comfort with, and acceptance level of, automation in the controller domain. When controllers are more comfortable with automated route determination, they can spend less time and energy determining such routes themselves.

Embodiments of the present disclosure can track aircraft movements around an airport over a period of time (e.g., using radar). These tracks can be combined with current conditions and used to determine routes. In some embodiments, the routes generated can more accurately depict routes that controllers would likely determine themselves, rather than the uninformed and context-lacking routes of previous approaches. Previous approaches may fall short because, for example, routing engines of previous approaches may be set up and/or configured incorrectly or preferences of controllers may change over time.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of aircraft" can refer to one or more aircraft.

Figure 1:
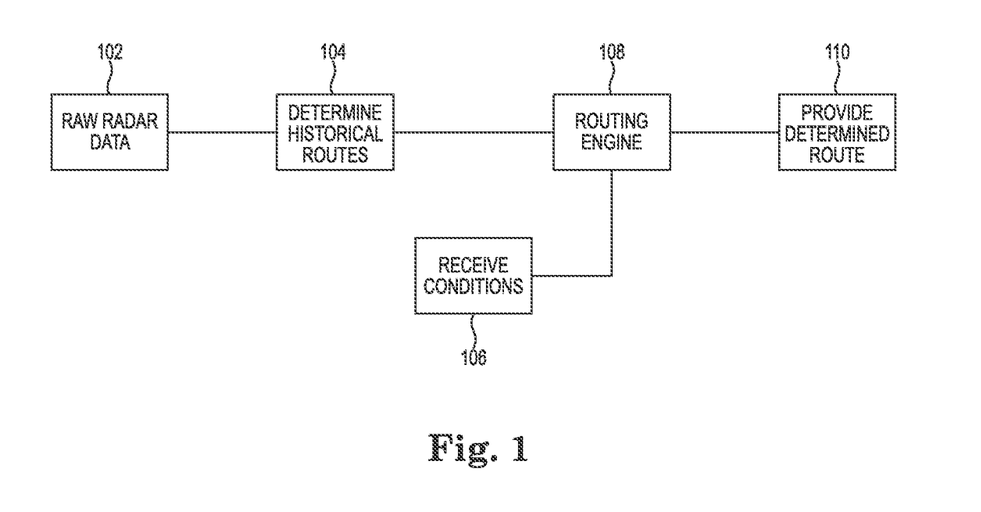
FIG. 1 illustrates a flow chart associated with aircraft taxi routing in accordance with one or more embodiments of the present disclosure.

FIG. 1 illustrates a flow chart 100 associated with aircraft taxi routing in accordance with one or more embodiments of the present disclosure. The flow chart 100 can represent one or more steps of a method performed by (e.g., instructions executed by) a computing device, such as the computing device 328 discussed below in connection with FIG. 3, for instance.

Raw radar data can be received at 102. In some embodiments, aircraft traveling in a taxiway of an airport can located at different positions by radar. However, embodiments of the present disclosure are not so limited. Location(s) of aircraft can be determined by other methods including, for instance, transponder signals. The radar data can be used to determine historical routes 104 taken by the plurality of aircraft. In some embodiments, historical routes can be determined over a period of time (e.g., a day, a week, a month, etc.). In some embodiments, historical routes determined may be associated by certain controllers assigned to their control. For instance, a subset of the historical routes may have occurred while a particular controller was on duty and/or in charge of controlling those routes. In some embodiments, historical routes can be determined from stored radar data. In some embodiments, historical routes can be determined as they are applied, executed, and/or traveled.

The historical routes may be rendered on a map of the airport and/or taxiway. The map can show the locations of various aircraft in and/or around the airport, as well as other vehicles such as "follow-me" vehicles, maintenance vehicles, etc. The routes may indicate a path taken by each aircraft from a start point to an end point. Start points and/or end points may differ depending on the particular flight. For instance, aircraft may be taxiing to or from different locations, such as a parking stand, a hangar, a runway, a holding position (e.g., waiting for a parking stand and/or runway), or other positions on a taxiway. As used herein, taxiing may refer to the movement of an aircraft on the ground, and taxiway may refer to a portion of an airport on which an aircraft may travel on the ground (e.g., an airfield).

The map may include a plurality of taxiway segments. As referred to herein, taxiway segments are discrete portions of a taxiway. Taxiway segments may be roads, runways, parking areas, etc. Taxiway segments may be defined by portions of a taxiway between intersections. Taxiway segments may be line segments, though embodiments herein are not so limited. In some embodiments, a taxiway segment can be connected to one or more adjoining parallel taxiway segments. In some embodiments, a taxiway segment can be connected to one or more adjoining taxiway segments that are not parallel to the taxiway segment.

An aircraft may travel from a first position on a taxiway (e.g., a start point) to a second position on a taxiway (e.g., an endpoint) by traversing one or more taxiway segments. Thus, each historical route may be defined, in part, by a particular subset of the taxiway segments (e.g., a particular subset in a particular order).

Embodiments herein can utilize the historical routes 104 to determine a route from a starting point to an endpoint, of a proposed taxiing of an aircraft. For example, a route between a hangar and a gate can be determined, a route between a gate and a runway can be determined, a route between a runway and a gate can be determined, and so on. In accordance with embodiments herein, the historical routes 104 can be combined with conditions particular to the airport 106 by a routing engine 108 to determine a route. The determined route can be provided, at 110, to a controller (e.g., a computing device and/or display associated with the controller). In some embodiments, the route can be provided to an aircraft. In accordance with embodiments herein, an aircraft can be guided from a starting point to an endpoint according to the determined route. In some embodiments, the controller may guide the aircraft by communicating the route to the aircraft. In some embodiments, the aircraft may be guided without user input according to the route (e.g., automatically).

The historical routes 104 can be sorted according to controller(s) that determined them and/or controlled their execution. Additionally, the historical routes 104 can be sorted according to particular aircraft and/or aircraft type that executed them.

The conditions particular to the airport 106 are conditions that bear upon a controller's determination of an aircraft route on a taxiway. For example, the conditions can include meteorological and/or weather conditions such as temperature, humidity, ambient light conditions, sun position, sun intensity, precipitation, wind speed, wind direction, visibility, etc. The conditions can include taxiway conditions such as taxiway surface conditions, wildlife impedance, maintenance conditions (e.g., portions of taxiway closed due to construction), etc. In some embodiments, the conditions can include logical runway orientation(s). For instance, some runways may be used for departure and some for arrival. Some runways may be used for departure and arrival depending on the day, time, and other conditions (e.g., wind direction). Additionally, conditions include the direction in which a runway is used (e.g., eastbound versus westbound), which may vary depending on a number of factors.

Figure 2:
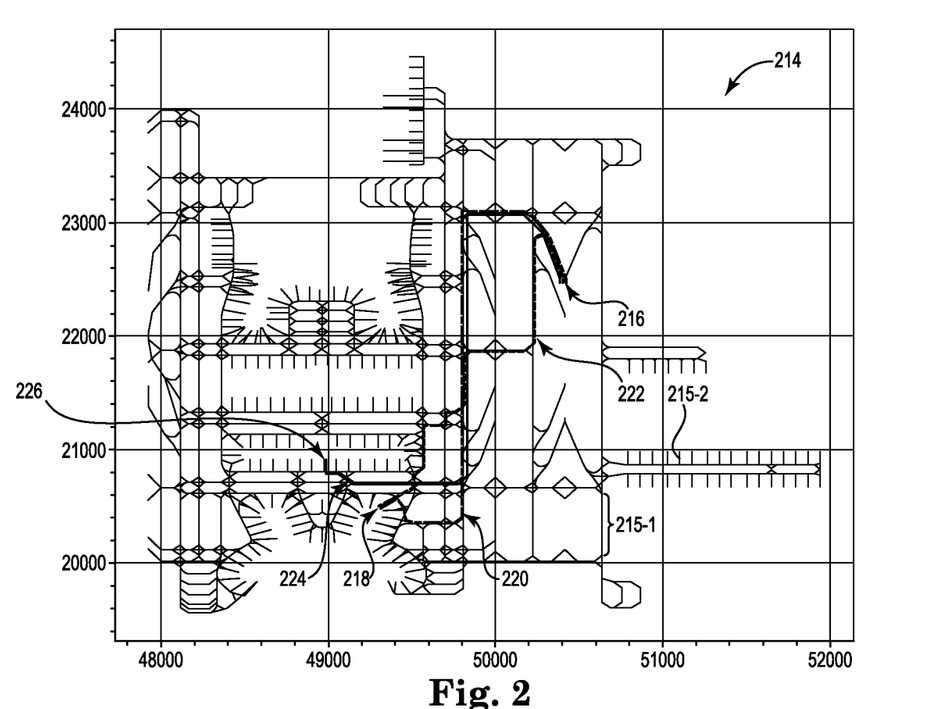
FIG. 2 illustrates an example map associated with aircraft taxi routing in accordance with one or more embodiments of the present disclosure.

The conditions can include attributes of the aircraft for which the route is being determined. The attributes of the aircraft can include, for instance, aircraft type and/or wingspan, among others. Aircraft type can include a model of the aircraft and/or the type of aircraft. For example, aircraft type can be denoted as an A388 J, indicating the aircraft model corresponding to flight call sign 214 ABC123 is an Airbus A380-800. A Boeing 747-400 may be indicated as "744" and an Airbus A330-300 may be indicated as "A333", although embodiments of the present disclosure are not limited to the above listed aircraft models.

Aircraft type can include a size of the aircraft. Aircraft type can include super heavy aircraft, heavy aircraft, medium aircraft, and/or small aircraft, although embodiments of the present disclosure are not limited to the above examples.

A route determined using previous approaches can be a route determined based on (e.g., solely based on) a distance between the starting point and the endpoint. For instance, a route determined using previous approaches can be a route determined irrespective of the historical routes 104. A route determined using previous approaches can be a route comprising a first subset of the plurality of taxiway segments. For example, the first determined route can be a route determined to include a subset of the plurality of taxiway segments comprising a shortest distance from the starting point to the endpoint. A route determined using previous approaches, in contrast with routes determined in accordance with embodiments of the present disclosure (discussed below) may be determined irrespective of controller preferences reflected by their historical aircraft taxiing control. A route determined using previous approaches may be a route determined by a "routing engine" irrespective of historical routes and/or preferences and may herein be referred to as an "engine route."

In accordance with the present disclosure, route determination by the routing engine 108 can be carried out using the map of the taxiway. For instance, the map can include N=|E| taxiway segments. Each taxiway segment i=1, ... N can have a length $w_i>0$ corresponding to the actual distance of the taxiway segment on the taxiway. The quantity of historical routes can be denoted by M, and each route $r_j$ can be defined as a tuple of taxiway segments $r_j=(i_{j,1}, i_{j,2}, \ldots, i_{j,n_j})$ Where $n_j$ is a specific number of taxiway segments of the given route. Further, each taxiway segment can be assigned a weight which can be multiplied by a factor $x_i \in [0.1, 10]$ (e.g., an indirection factor) for each $i=1, \ldots, N$. The factor can be considered as preference/aversion to use a particular taxiway segment (e.g., based on a correlation with the particular taxiway segment with the historical route(s)). The factors can be initiated to neutral $x_i=1$ for each $i=1, \ldots, N$.

In general terms, determining the second route can include initialization, where an iteration index can be set to $k=0$ and a set of relevant examples T00 can be initialized as an empty set $T^{(0)}=\emptyset$. A relevant example, for instance, can be a pair of routes between a starting point and an endpoint: a first route determined irrespective of historical routes (e.g., a route determined by a routing engine, sometimes referred to herein as an "engine route"), and a corresponding one of the plurality of historical (e.g., tracked) routes. The historical route can correspond to the engine route because the routes share a starting point and an endpoint. Embodiments of the present disclosure can include causing the historical route to be relatively cheaper than the engine route.

The engine route $c_j$ can be determined for each historical route $r_j$ using its starting point $i_{j,1}$ and its ending point $i_{j,n_j}$ using the actual factors $x_i$ for $i=1, \ldots N$. Historical-engine route pairs $(r_j, c_j)$ can be inserted into a set of relevant examples $T^{(k)}$, provided that the engine route is different than the historical route ($r_j \neq c_j$) (e.g., comprises a different set of taxiway segments), and the engine route is not equivalent to an engine route from a previous iteration, i.e., there is no $(r,c) \in T^{(k-1)}$ such as $c=c_j$, for instance.

The determination of the second route can include solving a linear programming problem, wherein target (e.g., optimized) variables can be preference factors $x_i \in [0.1, 10]$, each relevant example can be transformed to an inequality constraint with a meaning of "historical route is cheaper than engine route," and the penalty is proportional to a distance of a preference factor from neutral value 1.0. A solution to the linear programming problem can be found, the routing engine can be updated with found preference factors (e.g., segment preference factors), and the process can iterate with another relevant example. If, however, there are not any relevant examples remaining (e.g., $T^{(k)}=T^{(k-1)}$) then the segment factors have been determined. The segment factors can be used to determine the second route in accordance with embodiments herein. Because, as discussed above, the segment factors cause the engine route to be made more expensive, embodiments of the present disclosure can propose to the controller the cheapest route, which is based on historical observations.

In more detail, given the specified factors $x_i$ for $i=1, \ldots, N$, the routing engine can determine route(s) based on the starting point and the endpoint. The determined routes can be labeled as $$c_j^{(k)} = (i_{j,1}^{(k)}, \ldots, i_{i,m_{k,j}}^{(k)}).$$

It is noted that particular methods for determining the engine route are not intended to be limited by embodiments herein.

The relevant example set can grow in each iteration $$T^{(k)} = T^{(k-1)} \cup \{(c_j^{(k)}, r_j) : c_j^{(k)} \neq r_j \wedge (c_j^{(k)}, r_j) \notin T^{(k-1)}\}$$

Stated differently, the set of relevant examples $T^{(k)}$ can be updated by all historical-engine route pairs $(r_j, c_j)$, provided that the engine route is different than the historical route ($r_j \neq c_j$), and the engine route is not equivalent to another one of the engine routes from previous iterations.

The linear programming problem, given $T^{(k)}$, and considering conditions $x_i \in [0.1, 10]$, can be formulated as:

$$\sum_{i \in r} w_i x_i + \epsilon \leq \sum_{i \in c} w_i x_i + x_{N+s}$$

$$\forall (c, r) \in T^{(k)}$$

where $\epsilon > 0$ is a small constant, s is an order number of $(c,r)$ in $T^{(k)}$ and $x_{N+s} \geq 0$ is a slack variable for this inequality. It is noted that a mapping $\omega(s)=(j,k)$ that returns an index of the slack variable to the index of example i and iteration k can be considered. The constant E can be used to force the statement "the historical route is cheaper (e.g., strictly cheaper) than the engine route." The routing engine 108 can be updated with the segment preference factors and can provide routes that match (or substantially match) one or more historical routes. Accordingly, historical, and thus proven to be preferred, routes can be provided to the controller rather than uninformed engine-based routes.

In order to accomplish the target of $x_i$ approaching value 1, $x_i = 1 + x_{i-} + x_{i+}$ can be substituted, where $x_{i-} \in [-0.9, 0]$ and $x_{i+} \in [0, 9]$. As a result, the constraint formulation can change to:

$$\sum_{i \in r} w_i (1 + x_{i-} + x_{i+}) + \epsilon \leq \sum_{i \in c} w_i (1 + x_{i-} + x_{i+}) + x_{N+s}$$

$$\forall (c, r) \in T^{(k)}$$

Which can be entered into the routing engine 108 in the following form:

$$\sum_{i \in r} w_i x_{i-} + \sum_{i \in r} w_i x_{i+} - \sum_{i \in c} w_i x_{i-} - \sum_{i \in c} w_i x_{i+} - x_{N+s} + \epsilon \leq \sum_{i \in c} w_i - \sum_{i \in r} w_i$$

$$\forall (c, r) \in T^{(k)}$$

where the objective can be to minimize:

$$\sum_{i=1}^{N} z_{i-} x_{i-} + \sum_{i=1}^{N} z_{i+} x_{i+} + \gamma \sum_{s=1}^{|T^{(k)}|} x_{N+s}$$

where $z_{i-} < 0$ is a "preference" penalty (e.g., $z_{i-}$ is negative), $z_{i+} > 0$ is a "prohibition" penalty, and y is a large slack penalty constant (e.g., y=1e6). The ratio between $z_{i-}$ and $z_{i+}$ can influence the preference or prohibition of certain taxiway segments. Once the above problem is solved, the solution $x_i = 1 + x_{i-} + x_{i+}$ for all $i = 1, \ldots, N$ can be fed back to the routing engine at 108 in order to begin the next iteration.

In some embodiments, the objective can be formulated as piecewise linear in order to fine tune the ratio between preference and prohibition. For instance, the substitution can change to:

$$x_i = 1 + \sum_{q=1}^{Q} x_{(i,q)-} + \sum_{r=1}^{R} x_{(i,r)+}$$

and the objective can change accordingly, penalizing higher q and r (e.g., $z_{(i,r)-} < z_{(i,r+1)+}$ and $z_{(i,q)-} > z_{(i,q+1)-}$) such that the resulting criterion is convex with the penalty for $x_i$ being higher at the extremes of $x_i$ and lowest at 1. In some embodiments, the objective can be formulated as a quadratic problem:

$$\sum_{i=1}^{N} (1 - x_i)^2 + \gamma \sum_{s=1}^{|T^{(k)}|} x_{N+s}$$

In some embodiments, the penalty parameters $z_{i-}$ and $z_{i+}$ can be different for each taxiway segment i (e.g., having respective values for each taxiway segment). Such embodiments may be advantageous when particular prior knowledge of the taxiway is available. For example, a controller may know which taxiway segments and/or directions of travel are likely to be prohibited or preferred). This can also be achieved by using constraints such as $x_{i+}=0$ if, for example, the direction cannot be penalized.

Determining the penalty parameters $z_{i-}$ and $z_{i+}$ can include defining a quality of the match on a validation set. In some embodiments, this can be implemented as a Jaccard similarity index (e.g., a weighted Jaccard similarity index). Then, possible combinations of $z_{i-}$ and $z_{i+}$ can be tested (e.g., the quality of the match can be quantified). The combination with the highest quality can be used for the penalty parameters.

It is noted that the range [0.1,10] discussed above is an example; in some embodiments, the range may have other values [α,β] for 0<α<1<β. These values can be subject to meta-optimization using a validation set, as discussed above, for instance.

In some embodiments, taxiway segments that are not in the actual $T^{(k)}$ can be removed from the determination to remove problem dimensionality. For example, some taxiway segments may not be used by the routing engine 108 (e.g., used below a threshold) and may be ignored in some embodiments. In some embodiments, further reduction in problem dimensionality can be attained by merging multiple sequential edges without directional changes into a single edge. Stated differently, embodiments herein can include combining at least two adjoining parallel taxiway segments in the map such that the map comprises a reduced quantity of taxiway segments.

FIG. 2 illustrates an example map 214 associated with aircraft taxi routing in accordance with one or more embodiments of the present disclosure. The map 214 can depict a portion of an airport (e.g., a taxiway), for instance. The map 214 can include a plurality of taxiway segments 215. Two example taxiway segments 215 (e.g., taxiway segment 215-1 and taxiway segment 215-2) are specifically denoted in FIG. 2 for purposes of illustration and the remaining taxiway segments are not specifically denoted so as not to obscure embodiments of the present disclosure. As previously discussed, taxiway segments 215 in accordance with embodiments of the present disclosure can differ in length and orientation.

A historical route 220 has been mapped in the map 214 between a start point 216 and an endpoint 218. The historical route 220 represents a path actually taken by at least one aircraft. The historical route 220 can be determined using radar tracking, in some embodiments. The historical route 220 can be considered to comprise a particular subset of the plurality of taxiway segments 215 between the start point 216 and the endpoint 218.

Using the start point 216 and the endpoint 218, a route determined using previous approaches (e.g., such as that previously discussed in connection with FIG. 1) is shown as a first route 222. The first route 222, as previously discussed, can be determined irrespective of the historical route 220. The first route 222 can be determined irrespective of any historical routes in some embodiments. The first route 222 can comprise a different subset of the plurality of taxiway segments 215 than the historical route 220. It is noted that some taxiway segments 215 may be included in both the historical route 220 and the first route 222. The first route 222 can be a shorter route than the historical route 220. Stated differently, taxiway segments 215 comprising the first route may be cumulatively shorter in length than taxiway segments 215 comprising the historical route 220.

A proposed taxiing of an aircraft can have a proposed start point 226 and a proposed endpoint 218 (which is a same endpoint 218 of the historical route 220 and the first route 222). Embodiments of the present disclosure can determine a second route 224 between the proposed start point 226 and the proposed endpoint 218 based on the historical route 220 and conditions particular to the airport (e.g., as previously discussed). Embodiments herein can propose the historical route 220 instead of the first route 222. Embodiments herein can propose the second route 224 instead of the first route 222 (e.g., according to controller preferences).

Because, as discussed in connection with FIG. 1, the historical route 220 (e.g., taxiway segments of the historical route 220) is preferable over the first determined route, the second determined route matches the historical route 220 to a greater degree than it does the first determined route 222. The historical route 220 can be considered to be preferable over the first determined route 222 because it is a route devised by, and/or controlled by, the controller. Thus, the needs of a controller, having used portions of that route in the past, can be better met by the second route 224 than the first route 222.

The second determined route 224 (e.g., the map 214 depicting the second determined route 224) can be provided to the controller. In some embodiments, the second determined route 224 can be provided via a display and/or graphical user interface (e.g., such as that discussed below in connection with FIG. 3). The second determined route 224 can include turn-by-turn directions, in some embodiments. Additionally, the second determined route 224 can be communicated to the aircraft. In one or more embodiments, the aircraft can be guided from the start point 226 to the endpoint 218 according to the second determined route 224.

In some embodiments, the second determined route 224 can be modified (e.g., by the controller). For example, the second determined route 224 route for the aircraft may be modified via a user input. In some examples, the user input may be via a touch screen display. The controller may select a portion of the second determined route 224 for the aircraft, and slide the route from the original route to a new route, altering the route for the aircraft. Such modifications may be received as feedback from the controller and utilized in future route determination.

In some embodiments, the controller may modify routes by drawing new routes via a user input. For example, a controller may draw on the airport map 214 a desired route for the aircraft. In some embodiments, a controller may select points and/or taxiway segments 215 on the airport map 214 and embodiments herein can generate a revised route using the selected points.

Figure 3:
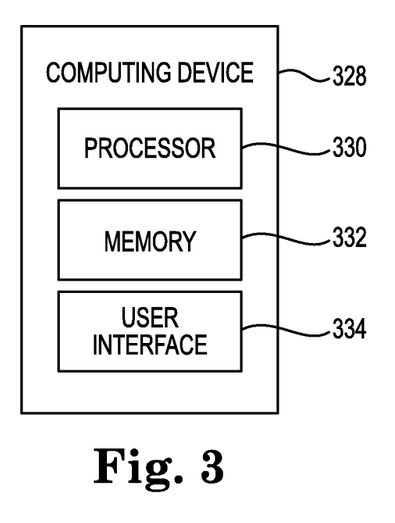
FIG. 3 illustrates a computing device for aircraft taxi routing in accordance with one or more embodiments of the present disclosure.

FIG. 3 illustrates a computing device 328 for aircraft taxi routing in accordance with one or more embodiments of the present disclosure. As illustrated in FIG. 3, computing device 328 can include a user interface 334, a memory 332, and a processor 330 to provide aircraft taxi routing in accordance with the present disclosure.

Computing device 328 can be, for example, a laptop computer, a desktop computer, and/or a mobile device (e.g., a smart phone, tablet, personal digital assistant, smart glasses, a wrist-worn device, etc.), and/or redundant combinations thereof, among other types of computing devices.

The memory 332 can be any type of storage medium that can be accessed by the processor 330 to perform various examples of the present disclosure. For example, the memory 332 can be a non-transitory computer readable medium having computer readable instructions (e.g., computer program instructions) stored thereon that are executable by the processor 330 to provide aircraft taxi routing in accordance with the present disclosure.

The memory 332 can be volatile or nonvolatile memory. The memory 332 can also be removable (e.g., portable) memory, or non-removable (e.g., internal) memory. For example, the memory 332 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 332 is illustrated as being located within computing device 328, embodiments of the present disclosure are not so limited. For example, memory 332 can also be located internal to another computing resource (e.g., enabling computer readable instructions to be downloaded over the Internet or another wired or wireless connection).

As illustrated in FIG. 3, computing device 328 includes a user interface 334. For example, the user interface 334 can display determined route(s) and/or map(s). A user (e.g., operator) of computing device 328, such as a controller, can interact with computing device 328 via user interface 334. For example, user interface 334 can provide (e.g., display and/or present) information to the user of computing device 328, and/or receive information from (e.g., input by) the user of computing device 328. For instance, in some embodiments, user interface 334 can be a graphical user interface (GUI) that can provide and/or receive information to and/or from the user of computing device 328. The display can be, for instance, a touch-screen (e.g., the GUI can include touch-screen capabilities). Alternatively, a display can include a television, computer monitor, mobile device screen, other type of display device, or any combination thereof, connected to computing device 328 and configured to receive a video signal output from the computing device 970.

As an additional example, user interface 334 can include a keyboard and/or mouse the user can use to input information into computing device 328. Embodiments of the present disclosure, however, are not limited to a particular type(s) of user interface.

User interface 334 can be localized to any language. For example, user interface 334 can display and/or receive information in any language, such as English, Spanish, German, French, Mandarin, Arabic, Japanese, Hindi, etc.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A non-transitory computer-readable medium having instructions stored thereon which, when executed by a processor, cause the processor to:
   receive a record of a plurality of historical routes taken by a plurality of aircraft through taxiways of an airport;
   determine a tendency particular to an air traffic controller to use each of a plurality of segments of the taxiways of the airport based on the plurality of historical routes;
   receive a plurality of conditions particular to the airport;
   receive a starting point of a proposed route in the airport and an endpoint of the proposed route in the airport, wherein the starting point of the proposed route in the airport and the endpoint of the proposed route of the airport are associated with a proposed taxiing of an aircraft;
   determine a route between the starting point of the proposed route of the airport and the endpoint of the proposed route of the airport based on the tendency particular to the air traffic controller to use each of the plurality of segments of the taxiways of the airport and the plurality of conditions; and
   provide the determined route between the starting point of the proposed route of the airport and the endpoint of the proposed route of the airport to the air traffic controller.

2. The medium of claim 1, including instructions to determine the historical routes using radar associated with the airport.

3. The medium of claim 1, wherein the determined route between the starting point of the proposed route of the airport and the endpoint of the proposed route of the airport is longer than a route determined irrespective of the tendency particular to the air traffic controller to use each of the plurality of segments of the taxiways of the airport and the plurality of conditions.

4. The medium of claim 1, including instructions to provide the determined route between the starting point of the proposed route of the airport and the endpoint of the proposed route of the airport to the air traffic controller via a display configured to provide air traffic control.

5. The medium of claim 1, including instructions to provide the determined route between the starting point of the proposed route of the airport and the endpoint of the proposed route of the airport to the aircraft for which the taxiing is proposed.

6. The medium of claim 1, including instructions to determine the tendency particular to the air traffic controller based on a subset of the plurality of historical routes.

7. The medium of claim 3, wherein the route determined irrespective of the tendency particular to the air traffic controller to use each of the plurality of segments of the taxiways of the airport and the plurality of conditions is determined by a computing device based on a distance between the starting point and the endpoint.

8. The medium of claim 1, including instructions to:
receive feedback from the air traffic controller regarding the determined route between the starting point of the proposed route of the airport and the endpoint of the proposed route of the airport; and
generate a second determined route based on the feedback.

9. A computing device for aircraft taxi routing, comprising:
a processor; and
a memory having instructions stored thereon which, when executed by the processor, cause the processor to:
determine a plurality of historical routes taken by a plurality of aircraft through taxiways of an airport by tracking the plurality of aircraft using radar over a period of time;
determine a tendency particular to an air traffic controller to use each of a plurality of segments of the taxiways of the airport based on the plurality of historical routes;
receive a starting point of the airport and an endpoint of the airport, wherein the starting point of the airport and the endpoint of the airport are associated with a proposed taxiing of an aircraft;
receive a set of conditions particular to the airport and associated with a time of the proposed taxiing;
determine a route from the starting point of the airport to the endpoint of the airport based on the tendency particular to the air traffic controller to use each of the plurality of segments of the taxiways of the airport and the set of conditions; and
display the determined route from the starting point of the airport to the endpoint of the airport on an interface of the air traffic controller.

10. The computing device of claim 9, including instructions determine the route from the starting point of the airport to the endpoint of the airport based, at least in part, on a subset of the historical routes traveled while under control of the air traffic controller.

11. The computing device of claim 9, including instructions to determine the route from the starting point of the airport to the endpoint of the airport based on a plurality of attributes of the aircraft.

12. The computing device of claim 11, wherein the attributes of the aircraft include a wingspan of the aircraft.

13. The computing device of claim 9, wherein the set of conditions particular to the airport include a current weather condition at the airport.

14. The computing device of claim 9, wherein the set of conditions particular to the airport include a current visibility at the airport.

15. A method for aircraft taxi routing, comprising:
tracking a plurality of aircraft through a plurality of taxiway segments of an airport using radar over a period of time;
determining a plurality of historical routes taken by the plurality of aircraft based on the tracking, each of the plurality of historical routes comprising a respective subset of the plurality of taxiway segments;
determining a tendency particular to an air traffic controller to use each of the plurality of taxiway segments based on the plurality of historical routes;
receiving a starting point of the airport and an endpoint of the airport, wherein the starting point of the airport and the endpoint of the airport are associated with a proposed taxiing of an aircraft;
determining a route from the starting point of the airport to the endpoint of the airport based, at least in part, on the tendency particular to the air traffic controller to use each of the plurality of taxiway segments, the determined route comprising a particular subset of the plurality of taxiway segments; and
displaying the determined route from the starting point of the airport to the endpoint of the airport on an interface of an air traffic controller.

16. The method of claim 15, wherein determining the route includes multiplying a weight assigned to each taxiway segment by a respective indirection factor representing the respective tendency to use each of the plurality of taxiway segments.

17. The method of claim 16, wherein determining the route from the starting point of the airport to the endpoint of the airport includes determining the respective indirection factor based on a correlation with the respective taxiway segment and the plurality of historical routes.

18. The method of claim 16, wherein determining the route includes determining the respective indirection factor based on a user input.

19. The method of claim 15, wherein the airport comprises a first quantity of taxiway segments, wherein determining the route from the starting point of the airport to the endpoint of the airport includes combining at least two adjoining parallel taxiway segments in a map of the airport such that the map of the airport comprises a second quantity of taxiway segments, and wherein the second quantity is less than the first quantity.

* * * * *